Jan. 4, 1944.    C. W. MacMILLAN    2,338,292
VALVE MECHANISM
Filed Dec. 28, 1939    2 Sheets-Sheet 1
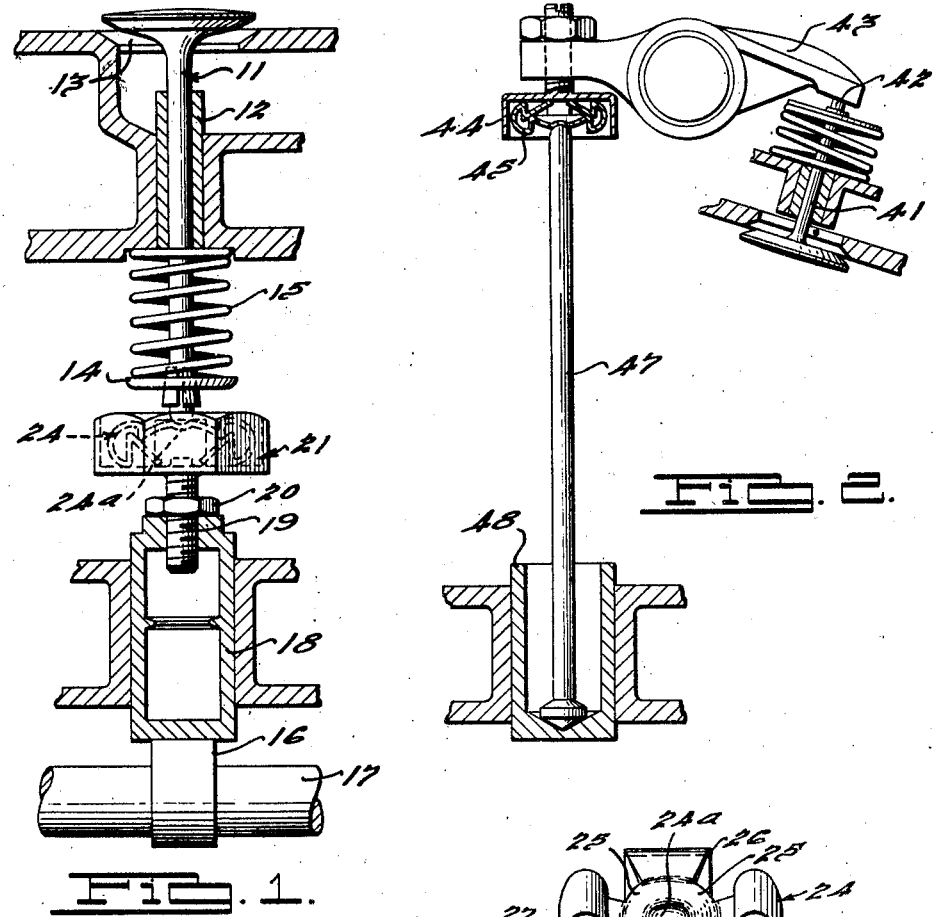
INVENTOR
Charles W. MacMillan.
BY Dike, Calver & Gray
ATTORNEYS.

Jan. 4, 1944. C. W. MacMILLAN 2,338,292
VALVE MECHANISM
Filed Dec. 28, 1939 2 Sheets-Sheet 2

INVENTOR
Charles W. MacMillan.
BY Dike, Calver & Gray
ATTORNEYS.

Patented Jan. 4, 1944

2,338,292

UNITED STATES PATENT OFFICE 2,338,292

VALVE MECHANISM

Charles W. MacMillan, Detroit, Mich.

Application December 28, 1939, Serial No. 311,262

13 Claims. (Cl. 123—90)

This invention relates to valve mechanisms, such for instance as used in internal combustion engines, and more particularly to adjustment or clearance controlling devices therefor sometimes referred to in the art as "automatic valve tappets."

Improper adjustment of a valve mechanism, which may be caused by thermal expansion of the parts thereof or by lack of proper care, or wear, produces either insufficient clearance between the valve actuating cam and the valve lifter or too much clearance therebetween. Insufficient clearance causes failure of the valve to seat properly and results in inefficient and faulty operation of the engine. Excessive clearance causes noisy operation and rapid wear of the valve mechanism.

One of the objects of the present invention is to provide an improved valve mechanism having a clearance eliminating device which automatically eliminates the clearance between the cam and the valve lifter in such a way that the valve always seats properly and noiselessly, and the cam engages the valve lifter without objectionable impact or noise.

Another object of the invention is to provide an improved device for controlling the seat clearance and the tappet clearance of a valve mechanism, said device including a resilient member the action of which does not objectionably decrease the valve opening in the upper position of the valve and therefore does not affect the volumetric efficiency of the engine.

A further object of the invention is to provide an improved valve mechanism having a clearance eliminating device which acts automatically and continuously while the engine is in operation, and does not require stopping of the engine for effecting proper adjustments.

A still further object of the invention is to provide an improved clearance eliminating device for a valve mechanism which is susceptible of manufacture by stamping operations.

It is an added object of the present invention to provide an improved valve adjusting device which is simple in construction, dependable in operation, and relatively inexpensive to manufacture.

Other objects and advantages of this invention will appear in the following description and appended claims, reference being had to the accompanying drawings forming a part of this specification wherein like reference characters designate corresponding parts in the several views.

Fig. 1 is a view partly in section illustrating a valve mechanism embodying the present invention, together with a portion of the cam shaft and a part of the engine block of the L-head type.

Fig. 2 illustrates a valve mechanism embodying the present invention and adapted for an internal combustion engine of the valve-in-head type.

Fig. 3 is an exploded view showing the automatic clearance controlling device embodying the present invention.

Fig. 4 is a perspective view showing the resilient member employed in the valve mechanisms illustrated in Figs. 1, 2 and 3.

Fig. 5 is a top view of the member shown in Fig. 4 in perspective.

Figure 6:
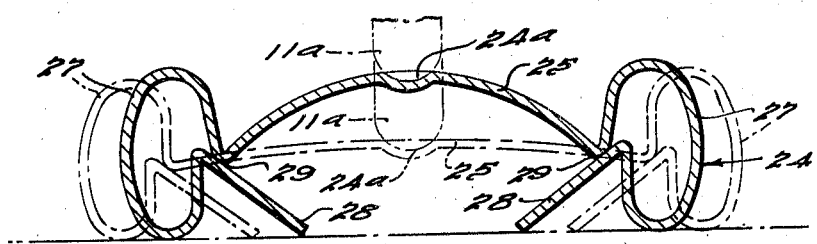
Fig. 6 is a sectional view showing in full lines the resilient member in its undistorted condition, the shape of said member under the load of the compressed valve spring being indicated in dotted lines.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are shown by way of example two valve mechanisms embodying the present invention. Referring to Fig. 1 the valve mechanism illustrated therein comprises a poppet valve 11 slidably fitted in a valve guide bushing 12 and adapted to sit in a valve seat 13 for closing a port leading to the combustion chamber of an internal combustion engine of the L- head type. The lower extremity of the valve stem carries a spring supporting washer 14 supporting a valve spring 15 tending to maintain the valve in its fully closed position. The spring is of the compression type and in the fully closed position of the valve it is under a relatively slight compression.

Opening of the valve 11 is effected with the aid of a cam 16 formed on a rotatable cam shaft 17. The cam 16 engages a follower or a valve lifter 18 carrying a clearance eliminating or clearance controlling device secured to said valve lifter with the aid of a screw 19 permitting desirable initial adjustments. A lock nut 20 is provided on the screw 19 to prevent undesirable rotation thereof.

The clearance controlling or clearance eliminating device comprises a cup-shaped retainer 21 integral with the screw 19 and having milled sides 22 for convenient engagement of the retainer with a wrench. Within the recess 23 of the retainer 21 there is provided a resilient member generally indicated by the numeral 24, which member is adapted to be supported by the retainer 21 and to engage the end 11a of the valve stem 11 at an indent 24a.

The resilient member 24 comprises a drum shaped central portion 25 from which project outwardly a plurality, in the present instance four, legs 26. Each of said legs is bent upon itself to provide a loop 27 and an end ramp 28 supporting the leg at a contact point 29. The member 24 is preferably stamped from a single piece of sheet material, such as sheet steel, and the thickness and resilient characteristics of said material are so selected that the member 24 is capable of carrying considerable loads and particularly to convey the lifting effort from the cam 16 to the valve 11. However, because of a considerable size of the loops 27 they possess considerable resiliency and permit the ramps to move outwardly when force is applied on the central portion 25. It is to be noted that the ramps themselves are not distorted considerably when force is applied to the drummed portion. It is also very important to note that the angle of the ramps is such that a pressure force applied thereto in the direction of the valve stem axis is incapable of moving the ramps apart without the assistance of the toggle or lever action.

When the valve 11 is open the spring 15 is under compression and is effective to exert on the portion 25 a force capable of distorting the resilient member 24 which under load assumes the shape indicated in Fig. 6 in dotted lines. It will be understood that the resilient member 24 is distorted substantially within the limits indicated in Fig. 6 during the operative stroke of the valve 11, although the precise amount of said distortion varies at different points of said stroke. It should also be noted that in the conditions shown in Fig. 6 in the dotted lines the ramps 28 are moved apart, which movement is caused by the toggle or lever action of the flattening portion 25.

It should be understood that in the valve mechanism undesirable clearance may occur in two places. First, it may occur in the closed position of the valve between the valve 11 and the seat 13, this type of clearance being hereinafter termed "seat clearance." The second place where clearance may occur is between the cam 16 and the lifter 18, this type of clearance being hereinafter termed "tappet clearance." These two types of clearance do not exist simultaneously, and the presence of either is due to the lack of the other. Thus, seat clearance occurs when tappet clearance is not provided, and when tappet clearance occurs the seat clearance does not exist.

When the seat clearance tends to occur in my improved valve mechanism, which may be due to heating of the valve mechanism parts or other causes, the compression of the spring becomes effective to eliminate such clearance as it occurs by closing the valve 11. The elimination of clearance under such a condition is effected not by moving the valve lifter 18, but by pressing on the portion 25 and flattening the same, thus moving the ramps 28 apart by the toggle action of said portion 25 and legs 26. The resiliency of the member 24 is so selected that the creeping action thereof is ensured within predetermined limits, preferably about one-eighth of an inch, and therefore the possibility of occurrence of seat clearance and disadvantages resulting therefrom are practically eliminated. It should be noted that the actual deflection of the member 24 is very small and is measured in thousandths of an inch.

Figure 7:
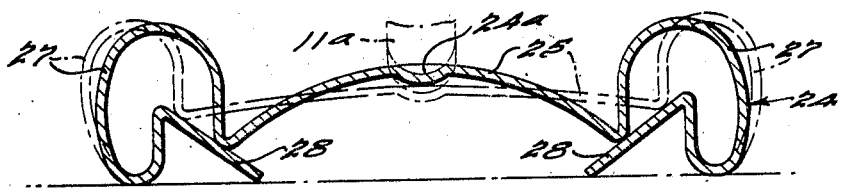
Fig. 7 is a view showing in full lines the shape of the resilient member assumed in the process of providing or eliminating the clearance which occurred in the valve; the shape of the resilient member under load is shown in dotted lines just as in Fig. 6.

When, on the other hand, tappet clearance tends to occur in the valve mechanism, it first manifests itself by the valve 11 tending to seat firmly in the seat 13 at the end of its downward stroke, the seat thus providing a stop for the spring 15 in its compressing action with respect to the resilient member 24. Thus, the pressure of the spring 15 on said member 24 becomes greatly relieved at the end of each downward stroke of the valve 11, but unless this pressure is relieved completely, the ramps 28 are held by friction from coming to their extreme inward position (shown in solid lines in Fig. 6). Because of the time element involved and, in some instances, of the cushioning effect of the gas film entrapped between the valve and the seat, tappet clearance tends to occur not instantaneously but within a period of some duration which permits the middle of the portion 25 to move to said stem end, which is to say into the position indicated in Fig. 7 in solid lines. But since the ramps 28 do not move all the way in, this movement causes creeping of the contact points 29 on the ramps 28. Such creeping action occurs with every opening stroke of the valve, producing in the device a constant tendency to eliminate seat clearance and to create tappet clearance.

It is important to note that when the tappet clearance suddenly becomes because of the above tendency so excessive as to relieve completely the pressure on the member 24, the pressure on the ramps 28 at contact points 29 also ceases. Elimination of the pressure on the ramps 28 also destroys the frictional force holding the ramps in their pushed-apart positions and the ramps 28 move all the way inward. In consequence thereof the entire resilient member 24 is permitted to expand and to increase its over-all dimension along the line of force, thereby eliminating the tappet clearance. It should also be noted that the regulating action of the member 24 is not completed in one stroke of the valve and a number of strokes is actually taken before the member adjusts itself to the changing conditions.

Figure 8:
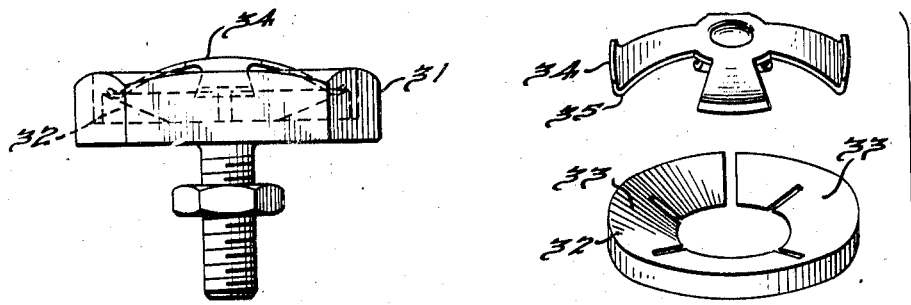
Fig. 8 is a side view of a clearance controlling device of a modified construction embodying the present invention.
Figure 9:
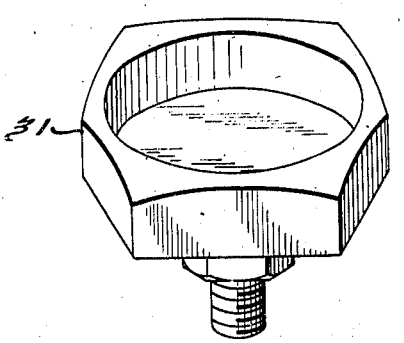
Fig. 9 is an exploded view showing in perspective the parts of the device of Fig. 8.

The structure illustrated in Figs. 8 and 9 comprises a retainer member 31 which is substantially similar to the retainer member 21 used in the structure described in Figs. 1 to 7. The retainer 31 is adapted to receive a split ring 32 provided with slanted surfaces 33 corresponding to the ramps 28 of the structural Figs. 1 to 7.

The resilient member 34 is carried by the split ring 32 as shown in Fig. 8. The ring 32 possesses a certain amount of resiliency and is adapted to spread for some distance when the resilient member exerts a pressure thereon, thus acting substantially similar to the resilient member 24. When the force on the central portion of the resilient member 34 is released sufficiently, the ends 35 of the legs of the member 34 creep down on the slanted surfaces 33 similar to the contact points 29, while the contraction of the ring is prevented by the friction, and occurrence of the clearance is prevented by self-bending of the resilient member 34 and the closing action of the split ring 32.

Figure 10:
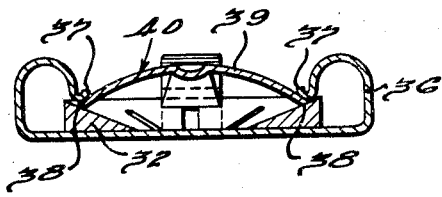
Fig. 10 is a sectional view illustrating a modified construction of the device of Fig. 8.

Fig. 10 illustrates a structure similar in part to that illustrated in Fig. 8, the retainer member being made in the form of a stamped piece 36 having turned down edges 37 adapted to bear upon the ends 38 on the legs 39 of the resilient member 40. Said member 40 corresponds to the resilient member 34 of the structure of Fig. 8 and cooperates with a ring 41 similar to ring 32. The action of the retainer ensures creeping down of the ends 38 of the legs 39.

Fig. 2 illustrates the use of my improved device in valve-in-head engines. As can be seen from an examination of said figure, the end of the stem of the valve 41 bears on the end 42 of the rocker arm 43. To the opposite end of said rocker arm there is secured a retainer member 44 housing a resilient member 45 engaging a push rod 47 bearing on the valve lifter 48. Although the members 44 and 45 are arranged upside down as compared with Fig. 1, operation of the device is substantially similar to that of the structure of Fig. 1. Devices illustrated in Figs. 8 and 10 may be used in the mechanism of Fig. 2 with an equal success.

It is to be distinctly understood that the provision, instead of my toggle resilient member 24, of an element depending for its regulating action solely on its resiliency, such as a mere coil spring, does not solve the problem of controlling clearances of a valve mechanism. Such an element must necessarily be sufficiently resilient through the initial portion of its deflection cycle in order to be compressible by the valve spring when the same is not capable of exerting an appreciable force thereon, and this will make the deflection of such element at the end of the cycle so large as to decrease the effective valve opening at the full open position of the valve and to affect the volumetric efficiency of the engine. My resilient device is relatively very stiff, and it is distorted during the deflection cycle not by a weak force of the slightly compressed valve spring but by the maximum force of the spring greatly multiplied by the toggle action of the device, the toggle action disappearing during the succeeding portions of the deflection cycle.

I claim:

1. In a valve mechanism, a clearance eliminating device operatively interposed in said mechanism and comprising a resilient member and a substantially rigid support therefor adapted to transmit the valve operating force, said member and rigid support being resiliently connected together to expand and to consume clearance as the same tends to occur in said valve mechanism, and frictional means comprising ramps adapted to prevent such movement when there is no such clearance in said mechanism and a valve operating force is transmitted thereby.

2. In a valve mechanism, a clearance eliminating device operatively interposed in said mechanism and comprising a resilient member including a central portion and a plurality of radially extending legs bent to form a convex member, and a substantially rigid support for said member resiliently connected thereto, said member and support being adapted because of said connection to move causing expansion of said device for eliminating clearance as the same tends to occur in said valve mechanism, and frictional means adapted to prevent such movement when there is no such clearance in said mechanism and a valve operating force is transmitted thereby.

3. In a valve mechanism, a clearance eliminating device operatively interposed in said mechanism, said device including a resilient convex member stamped from sheet material and having a central portion and a plurality of resilient legs, a support for each of said legs, said legs being adapted to move said supports and thereby to decrease the effective over-all dimension of said device when a force is transmitted thereby, and resilient means adapted to move said supports in return directions when clearance is created at said device, thereby consuming said clearance.

4. In a valve mechanism, a clearance eliminating device operatively interposed in said mechanism, said device including a resilient convex member stamped from sheet material and having a central portion and a plurality of resilient legs, an angular support for each of said legs, said legs being adapted to move said supports and thereby to decrease the effective over-all dimension of said device when a force is transmitted thereby, and resilient means adapted to move said supports in return directions when clearance is created at said device, thereby consuming said clearance, the angle of said supports being such that they are moved outwardly by said legs when force is transmitted by said member into positions determined by the maximum force transmitted, said supports frictionally resisting return movements until tappet clearance is created in said valve mechanism.

5. In a valve mechanism, a clearance eliminating device operatively interposed in said mechanism for transmission of the valve operating force, said device comprising a central member having a plurality of legs, support means for said member including an angular ramp for each of said legs, said ramps adapted to be held in place by friction when force is transmitted by said device, and resilient means for moving said ramps transversely of the direction of the force thereby moving said central member along the line of force for consuming the clearance as the same occurs at said device.

6. In a valve mechanism, a clearance eliminating device operatively interposed in said mechanism for transmission of the valve operating force, said device comprising a central member having a plurality of legs, support means for said member including an angular ramp for each of said legs, said ramps adapted to be held in place by friction when force is transmitted by said device, and resilient means connecting said central member and said ramps for moving said ramps inwardly of the device and thereby increasing the over-all dimension of the device along the line of force for eliminating tappet clearance as the said clearance tends to occur in the valve mechanism.

7. In a valve mechanism, a clearance eliminating device operatively interposed in said mechanism for transmission of the valve operating force, said device comprising a central member having a plurality of legs, support means for said member including an angular ramp for each of said legs, said ramps adapted to be held in place by friction when force is transmitted by said device, and resilient loops connecting said legs and said ramps and moving said ramps inwardly for expanding the device and consuming the tappet clearance as the same occurs in the valve mechanism.

8. In a valve mechanism, a clearance eliminating device operatively interposed in said mechanism for transmission of valve operating forces, said device comprising a stamped member having a central force receiving portion and a plurality of resilient legs, each of said legs having an end bent upon itself to form a resilient loop and an angular ramp engaging the end of the leg to support the same, said ramps being movable outwardly by said legs in opposition to said loops and retainable in their outer position by friction when force is transmitted by said device, said loops being capable of moving the ramps inwardly when transmission of force through said device ceases and clearance tends to occur therein, thereby eliminating said clearance.

9. In a valve mechanism, a clearance eliminating device operatively interposed in said mechanism for transmission of valve operating forces, said device comprising a member having a central portion and a plurality of resilient legs extending outwardly therefrom, said legs being bent upon themselves to form an end loop and a ramp at each leg, said ramps arranged to engage and support said legs, said legs being adapted to be resiliently distortable and to push said ramps apart when the valve is opened, said ramps being adapted to remain in their pushed apart positions as long as valve operating force is transmitted by said member.

10. In a valve mechanism, a clearance eliminating device operatively interposed in said mechanism for transmission of valve operating forces, said device comprising a member having a central portion and a plurality of resilient legs extending outwardly therefrom, said legs being bent upon themselves to form an end loop and a ramp at each leg, said ramps arranged to engage and support said legs, said legs being adapted to be resiliently distortable and to push said ramps apart when the valve is opened, said ramps being adapted to remain in their pushed-apart positions as long as valve operating force is transmitted by said member, said loops operating to move said ramps from said positions inwardly when tappet clearance occurs in said valve mechanism, thereby eliminating said clearance.

11. In a valve mechanism, a clearance eliminating device operatively interposed in said mechanism for transmission of valve operating forces, said device comprising a member having a central portion and a plurality of resilient legs extending outwardly therefrom, said legs being bent upon themselves to form an end loop and a ramp at each leg, said ramps arranged to engage and support said legs, said legs being resiliently distortable when the valve is opened to push said ramps apart, said ramps being adapted to remain in their pushed-apart positions as long as valve operating force is transmitted by said member, and said legs being further adapted to come to their substantially undistorted condition with said ramps substantially remaining in their pushed-apart positions when the valve reaches the end of its closing stroke, thereby contracting said member and eliminating valve seat clearance.

12. In a valve mechanism, a clearance eliminating device operatively interposed in said mechanism for transmission of valve operating forces, said device comprising a member stamped of sheet material and having a plurality of resilient legs extending outwardly therefrom, an integral extension on the end of each of said legs bent to form a resilient end loop and an angular ramp engaging the end of its respective leg for supporting the same, said legs being resiliently distortable to move said ramps apart as the valve opens, said ramps being held in such moved-apart positions by friction as long as valve operating force is transmitted by said member and moving to expand said member along the line of force when said force is interrupted by tappet clearance.

13. In a valve mechanism, a clearance eliminating device operatively interposed in said mechanism for transmission of valve operating forces, said device comprising a member stamped of sheet material and having a plurality of resilient legs extending outwardly therefrom, an integral extension on the end of each of said legs bent to form a resilient end loop and an angular ramp engaging the end of its respective leg for supporting the same, said legs being resiliently distortable and moving said ramps apart as the valve opens, said ramps being held in such moved-apart positions by friction as long as valve operating force is transmitted by said member and moving to expand said member along the line of force when said force is interrupted by tappet clearance, said legs being adapted to move on said ramps with each closing stroke of the valve to contract said member along the line of force.

CHARLES W. MacMILLAN.